(12) United States Patent
Sakurai

(10) Patent No.: US 7,009,367 B1
(45) Date of Patent: Mar. 7, 2006

(54) STEP-UP/DOWN SWITCHING REGULATOR CONTROL CIRCUIT AND STEP-UP/DOWN SWITCHING REGULATOR

(75) Inventor: Atsushi Sakurai, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/956,382

(22) Filed: Oct. 1, 2004

(51) Int. Cl.
*G05F 1/656* (2006.01)
*G05F 1/652* (2006.01)

(52) U.S. Cl. .................. 323/222; 323/282; 323/224

(58) Field of Classification Search .......... 323/222, 323/224, 282
See application file for complete search history.

(56) References Cited

U.S. PATENT DOCUMENTS

| | | | |
|---|---|---|---|
| 4,347,474 A * | 8/1982 | Brooks et al. ............. | 323/224 |
| 5,659,268 A * | 8/1997 | Kesner ...................... | 331/1 A |
| 5,708,376 A * | 1/1998 | Ikeda ........................ | 327/50 |
| 6,198,416 B1 * | 3/2001 | Velazquez .................. | 341/118 |
| 6,831,448 B1 * | 12/2004 | Ishii et al. ................ | 323/282 |
| 6,936,997 B1 * | 8/2005 | Mullett ..................... | 323/222 |

* cited by examiner

*Primary Examiner*—Bao Q. Vu
(74) *Attorney, Agent, or Firm*—Adams & Wilks

(57) ABSTRACT

To provide a step-up/down switching regulator control circuit and the step-up/down switching regulator which are stable in a wide output voltage range from step-up to step-down. According to the present invention, a plurality of phase compensating circuits, a circuit for detecting an input/output voltage, and a switching circuit are disposed in an error amplifier circuit, and a phase compensating circuit is switched to an optimum phase compensating circuit upon detecting the input/output voltage. In addition, the plurality of phase compensating circuits are structured in the exterior of the step-up/down switching regulator control circuit, and a proper phase compensating constant can be set according to an intended purpose.

7 Claims, 3 Drawing Sheets

STEP-UP/DOWN SWITCHING REGULATOR CONTROL CIRCUIT AND STEP-UP/DOWN SWITCHING REGULATOR

BACKGROUND OF THE INVENTION

1. Field of the Invention

The present invention relates to a switching regulator control circuit capable of readily switching an operation of a step up/down switching regulator at a step-up time and a step-down time in accordance with a relationship among an input voltage, an output voltage, and an output current, and to a switching regulator having the switching regulator control circuit.

2. Description of the Related Art

Shown in FIG. 2 is an example of conventional step-up/down switching regulator circuits. A switching regulator control circuit 1, a step-down switch 2, a step-up switch 6, a diode 7, a diode 4, and a coil 3 are connected to each other as shown in FIG. 2. In the circuit, a portion including the step-down switch 2, the diode 7, and the coil 3 corresponds to a conventional step-down switching regulator circuit. Another portion including the coil 3, the step-up switch 6, and the diode 4 corresponds to a conventional step-up switching regulator circuit. The switching regulator circuit 1 detects a voltage at a terminal Vout. When a step-up operation is required according to the relationship among the input voltage, the output voltage, and the output current, the switching regulator circuit 1 controls the step-up switch 6 so as to step up a voltage level of the terminal Vout to a desired voltage level. In this situation, the step-down switch 2 is always kept on. On the other hand, when a step-down operation is required according to the relationship among the input voltage, the output voltage, and the output current, the switching regulator circuit 1 controls the step-down switch 2 so as to step down the voltage level of the terminal Vout to a desired voltage level. In this situation, the step-up switch 6 is always kept off.

Subsequently, the operation of the switching regulator control circuit 1 will be described in more detail with reference to FIG. 3. A voltage Va resulting from dividing an output voltage Vout by means of a dividing resistor 11 and a dividing resistor 12 is inputted to a non-inverting input terminal of an error amplifier circuit 13. A reference voltage Vref that is outputted from a reference voltage circuit 10 is inputted to an inverting input terminal of the error amplifier circuit 13. The error amplifier circuit 13 outputs a result of amplifying a difference between the voltage Va and the reference voltage Vref as a voltage Verr.

A chopping wave Vosc that is outputted from a chopping wave oscillating circuit 14 is inputted to a non-inverting input terminal of a step-down comparator circuit 16 and then compared with the voltage Verr that is inputted to the inverting input terminal. When the voltage Verr falls within an amplitude range of the chopping wave Vosc, a rectangular wave VcompD is outputted from the step-down comparator circuit 16, and the switching regulator control circuit 1 controls the step-down switch 2 and conducts the step-down operation. In this situation, the step-up switch 6 is off.

The chopping wave Vosc that is outputted from the chopping wave oscillating circuit 14 is inputted to a non-inverting input terminal of a step-up comparator circuit 17 as a chopping wave Vosc1 that has been converted into a voltage by means of a level shifter 15. The chopping wave Vosc is then compared with the voltage Verr that is inputted to the inverting input terminal. When the voltage Verr falls within an amplitude range of the chopping wave Vosc1, a rectangular wave VcompU is outputted from the step-up comparator circuit 17, and the switching regulator control circuit 1 controls the step-up switch 6 and conducts the step-up operation. In this situation, the step-down switch 2 is on.

In addition, the error amplifier circuit 13 is held stable by means of a phase compensating circuit 38 (for example, refer to JP 2003-180072 A).

However, in the conventional step-up/down switching regulator, the number of phase compensating circuits for stabilizing the error amplifier circuit is one. Therefore, in a general purpose switching regulator that copes with various input and output conditions, it is difficult to set a constant of the phase compensating circuit for stabilizing the error amplifier circuit over an overall output voltage range from step-up to step-down. Also, there is a case where the phase compensating constant to be set is different between step-up and step-down depending on an intended purpose of the step-up/down switching regulator, and there arises such a problem that the use conditions are limited.

SUMMARY OF THE INVENTION

The present invention has been made to solve the above problem with the conventional art, and therefore an object of the present invention is to provide a step-up/down switching regulator control circuit and a step-up/down switching regulator, which realize an error amplifier circuit that is stable over a wide output voltage range from step-up to step-down.

In order to solve the above problem, according to the present invention, there are provided a step-up/down switching regulator control circuit and a step-up/down switching regulator, in which a plurality of phase compensating circuits are disposed in an error amplifier circuit, and a selecting circuit is provided for switching a phase compensating circuit to an optimum phase compensating circuit upon detecting an input/output condition. In addition, the plurality of phase compensating circuits are structured in the exterior of the step-up/down switching regulator control circuit, and a proper phase compensating constant can be set according to an intended purpose.

In the step-up/down switching regulator control circuit and the step-up/down switching regulator according to the present invention, the above-mentioned structure realizes the error amplifier circuit that is stable over a wide output voltage range from step-up to step-down.

Accordingly, the step-up/down switching regulator control circuit and the step-up/down switching regulator can be provided which are stable in the output voltage over a wide output voltage range.

DETAILED DESCRIPTION OF THE PREFERRED EMBODIMENTS

First Embodiment

Figure 1:
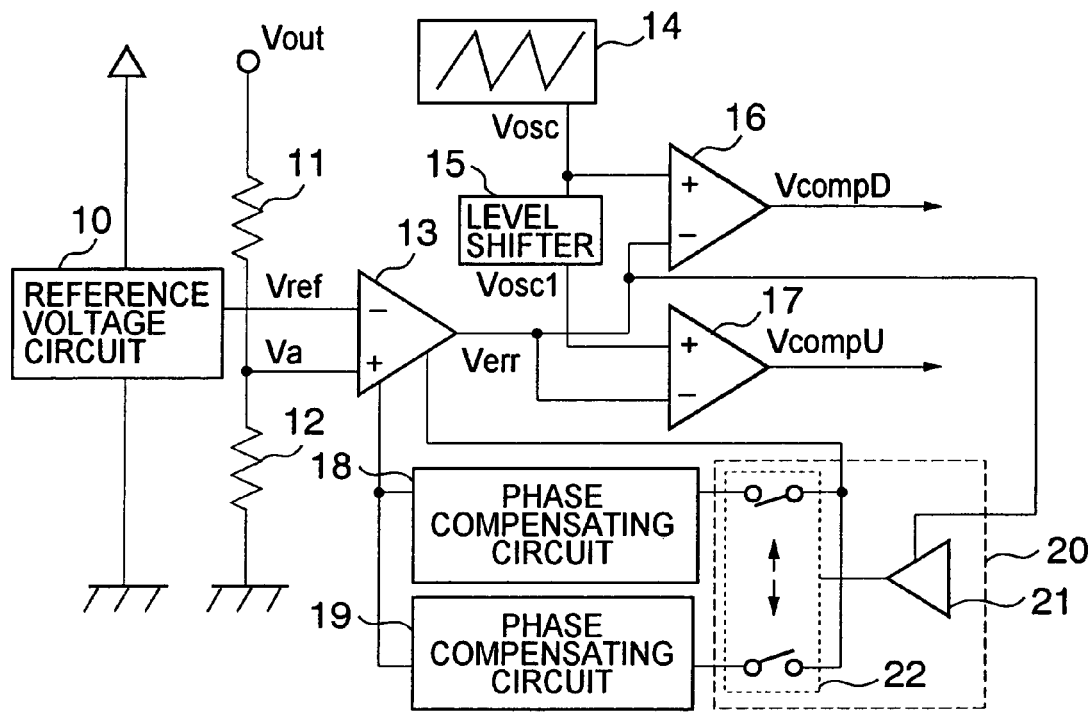
FIG. 1 is a circuit diagram showing a step-up/down switching regulator control circuit in accordance with a first embodiment of the present invention.

FIG. 1 is a circuit diagram showing a step-up/down switching regulator control circuit in accordance with a first embodiment of the present invention. The switching regulator control circuit includes a dividing resistor 11 and a dividing resistor 12 which divide an output voltage and output a voltage Va, a reference voltage circuit 10 that outputs a reference voltage Vref, an error amplifier circuit 13 that outputs a voltage Verr obtained by amplifying a difference between the voltage Va and the reference voltage Vref, a chopping wave oscillating circuit 14 that outputs a chopping wave Vosc, and a level shifter 15 that converts the chopping wave Vosc in voltage and outputs a chopping wave Vosc1. The switching regulator control circuit also includes a step-down comparator circuit 16 that compares the chopping wave Vosc with a voltage Verr and then outputs a switch control signal VcompD, and a step-up comparator circuit 17 that compares the chopping wave Vosc1 with the voltage Verr and then outputs a switch control signal VcompU. In the switching regulator control circuit thus structured, there are provided two phase compensating circuits 18 and 19 for keeping an operation of the error amplifier circuit 13 stable, and a selector circuit 20 including a voltage detector circuit 21 that detects the voltage Verr and a switch circuit 22 to control those two phase compensating circuits 18 and 19.

The voltage Va resulting from dividing the output voltage Vout by means of the dividing resistor 11 and the dividing resistor 12 is inputted to a non-inverting input terminal of the error amplifier circuit 13. The reference voltage Vref that is outputted from the reference voltage circuit 10 is inputted to an inverting input terminal of the error amplifier circuit 13. The error amplifier circuit 13 outputs a result of amplifying a difference between the voltage Va and the reference voltage Vref as the voltage Verr.

The chopping wave Vosc that is outputted from the chopping wave oscillating circuit 14 is inputted to a non-inverting input terminal of the step-down comparator circuit 16, and then compared with the voltage Verr that has been inputted to an inverting input terminal of the step-down comparator circuit 16. When the voltage Verr falls within an amplitude range of the chopping wave Vosc, the rectangular wave VcompD is outputted from the step-down comparator circuit 16, and the switching regulator control circuit 1 controls the step-down switch 2 and conducts the step-down operation. In this situation, the step-up switch 6 is off.

The chopping wave Vosc that is outputted from the chopping wave oscillating circuit 14 is inputted to the non-inverting input terminal of the step-up comparator circuit 17 as the chopping wave Vosc1 that has been converted into a voltage by means of the level shifter 15. The chopping wave Vosc is then compared with the voltage Verr that has been inputted to the inverting input terminal. When the voltage Verr falls within an amplitude range of the chopping wave Vosc1, the rectangular wave VcompU is outputted from the step-up comparator circuit 17, and the switching regulator control circuit 1 controls the step-up switch 6 and conducts the step-up operation. In this situation, the step-down switch 2 is on.

In the switching regulator control circuit according to the present invention, the error amplifier circuit 13 is kept stable by means of the phase compensating circuit 18 and the phase compensating circuit 19. The voltage detector circuit 21 detects a level of the voltage Verr and judges whether the switching regulator control circuit conducts the step-up operation or step-down operation. In response to the output of the voltage detector circuit 21, the selector circuit 20 operates so as to use the phase compensating circuit 18 in the case of the step-up operation and to use the phase compensating circuit 19 in the case of the step-down operation by switching the switch circuit 22. This structure makes it possible to set a step-up constant by means of the phase compensating circuit 18 and to set a step-down constant by means of the phase compensating circuit 19, separately. As a result, the switching regulator control circuit according to the present invention can keep the operation of the switching regulator stable in a wider input/output range than the conventional input/output range.

Second Embodiment

Figure 4:
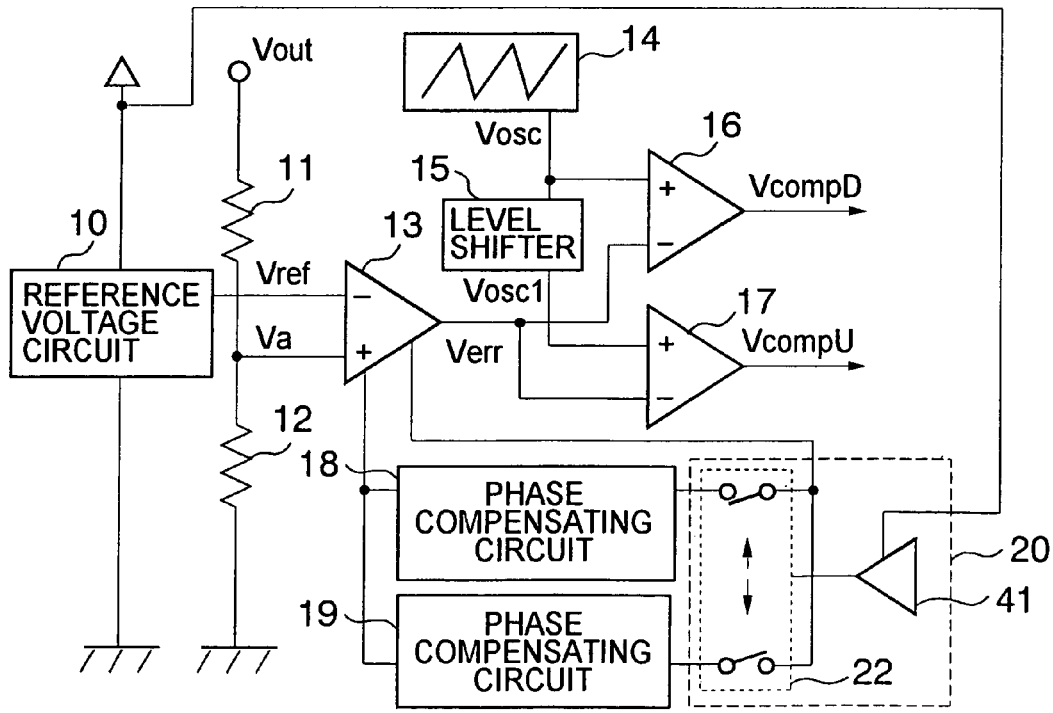
FIG. 4 is a circuit diagram showing a step-up/down switching regulator control circuit in accordance with a second embodiment of the present invention.

FIG. 4 is a circuit diagram showing a step-up/down switching regulator control circuit in accordance with a second embodiment of the present invention. The voltage detector circuit 21 according to the first embodiment detects a level of the voltage Verr whereas a voltage detector circuit 41 according to the second embodiment is so connected as to detect an input voltage Vin. Other structures are identical with those of the first embodiment.

In a switching regulator control circuit shown in FIG. 4, the voltage detector circuit 41 detects a level of the input voltage Vin and switches between the phase compensating circuit 18 and the phase compensating circuit 19. This structure makes it possible to set a low input voltage constant by means of the phase compensating circuit 18 and to set a high input voltage constant by means of the phase compensating circuit 19, separately. As a result, the switching regulator control circuit according to the present invention can keep the operation of the switching regulator stable in a wider input/output range than the conventional input/output range.

Third Embodiment

Figure 2:
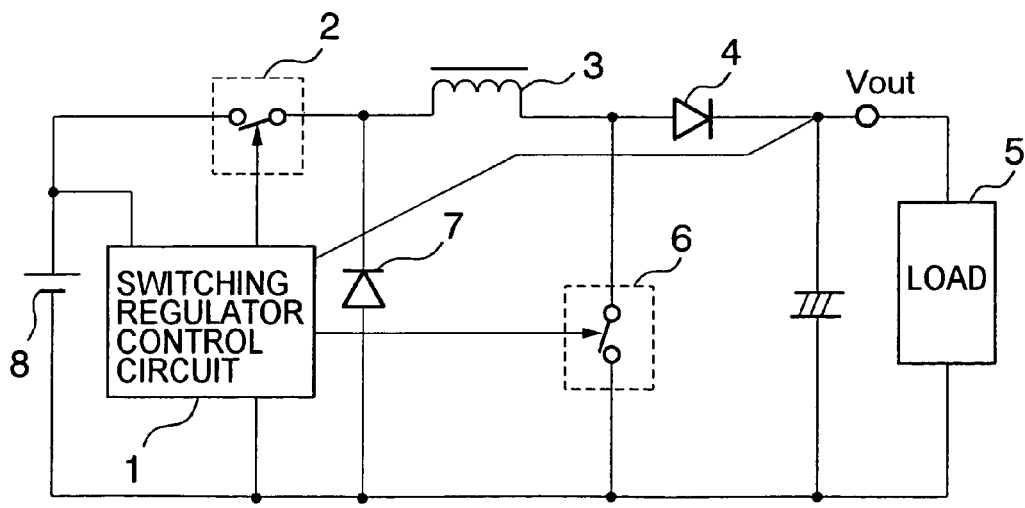
FIG. 2 is a circuit diagram showing a conventional step-up/down switching regulator.
Figure 3:
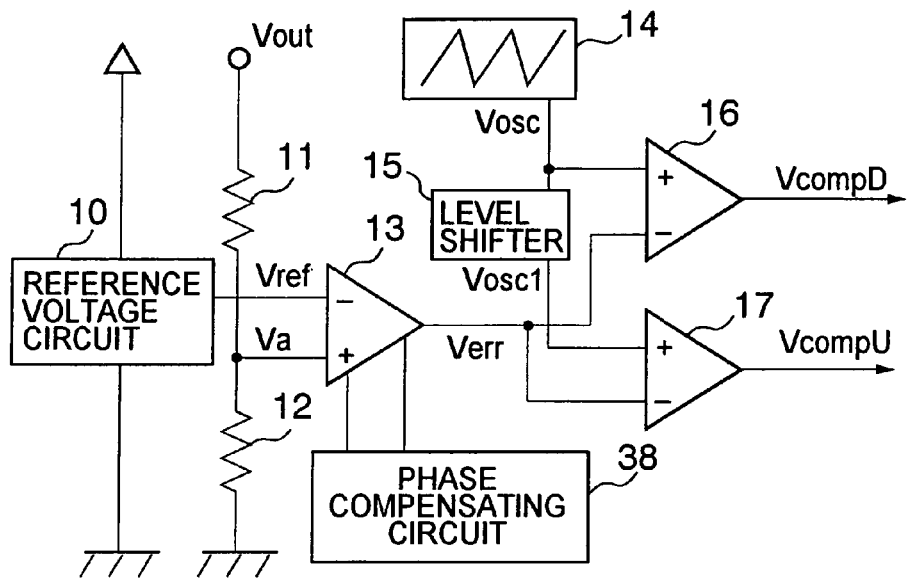
FIG. 3 is a circuit diagram showing a conventional step-up/down switching regulator control circuit.
Figure 5:
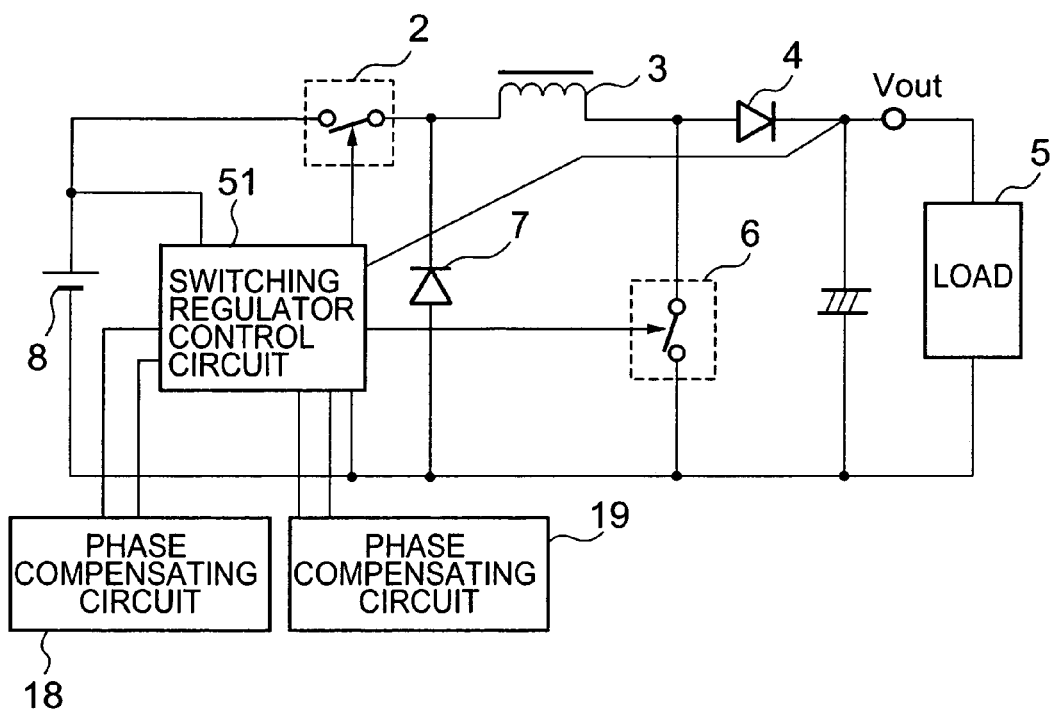
FIG. 5 is a circuit diagram showing a step-up/down switching regulator control circuit in accordance with a third embodiment of the present invention.

FIG. 5 is a circuit diagram showing a step-up/down switching regulator control circuit in accordance with a third embodiment of the present invention. In a step-up/down switching regulator shown in FIG. 5, phase compensating circuits 18 and 19 are disposed for the exterior of the switching regulator control circuit 51. Other structures are identical with those in FIG. 2. In other words, because the phase compensating circuits 18 and 19 are disposed outside the switching regulator control circuit 51, it is possible to set an appropriate phase compensation constant according to applications. This structure makes it possible to select phase compensation according to the input/output condition of each of the applications so as to keep the operation of the switching regulator stable in the wider input/output range than the conventional input/output range. Hence, this embodiment can provide a switching regulator that can be used in more applications.

Moreover, two phase compensating circuits are exemplified in the above embodiment. However, the number of phase compensating circuits is not limited to two, and three or more phase compensating circuits may be disposed. In response to the number of phase compensating circuits, the selecting function of the selector circuit 20 is changed so as to conduct the phase compensation according to various conditions. For example, in the case where a sensing resistor is externally disposed, it is possible to detect a voltage that develops in the sensing resistor, and to switch the phase compensation according to the output current.

DESCRIPTION OF REFERENCE NUMERALS

10, reference voltage circuit
14, chopping wave oscillating circuit
15, level shifter
18, 19, 38, phase compensating circuit
21, 41, voltage detector circuit

What is claimed is:

1. A step-up/down switching regulator control circuit for controlling a step-up/down switching regulator, which conducts a step-up operation when an input voltage is equal to or lower than a given voltage, and conducts a step-down operation when the input voltage is higher than the given voltage to output an output voltage, comprising:
    an error amplifier circuit that compares at least the output voltage with a reference voltage directly or indirectly to output information for holding the output voltage constant;
    a plurality of phase compensating circuits for keeping an operation of the error amplifier circuit stable; and
    a selector circuit that selects one or more of the plurality of phase compensating circuits,
    wherein the selector circuit switches the plurality of phase compensating circuits between a step-up time and a step-down time.

2. A step-up/down switching regulator control circuit for controlling a step-up/down switching regulator, which conducts a step-up operation when an input voltage is equal to or lower than a given voltage, and conducts a step-down operation when the input voltage is higher than the given voltage to output an output voltage, comprising:
    an error amplifier circuit that compares at least the output voltage with a reference voltage directly or indirectly to output information for holding the output voltage constant;
    a plurality of phase compensating circuits for keeping an operation of the error amplifier circuit stable; and
    a selector circuit that selects one or more of the plurality of phase compensating circuits,
    wherein the selector circuit switches the plurality of phase compensating circuits when detecting the input voltage.

3. A step-up/down switching regulator control circuit according to claim 2, wherein one or more of the plurality of phase compensating circuits are disposed in the exterior of the step-up/down switching regulator control circuit.

4. A step-up/down switching regulator which conducts a step-up operation when an input voltage is equal to or lower than a given voltage, and conducts a step-down operation when the input voltage is higher than the given voltage to output an output voltage, comprising:
    a step-up/down switching regulator control circuit according to claim 3 for controlling the output voltage.

5. A step-up/down switching regulator which conducts a step-up operation when an input voltage is equal to or lower than a given voltage, and conducts a step-down operation when the input voltage is higher than the given voltage to output an output voltage, comprising:
    a step-up/down switching regulator control circuit according to claim 2 for controlling the output voltage.

6. A step-up/down switching regulator which conducts a step-up operation when an input voltage is equal to or lower than a given voltage, and conducts a step-down operation when the input voltage is higher than the given voltage to output an output voltage, comprising:
    a step-up/down switching regulator control circuit according to claim 1 for controlling the output voltage.

7. A step-up/down switching regulator control circuit according to claim 1, wherein one or more of the plurality of phase compensating circuits are disposed in the exterior of the step-up/down switching regulator control circuit.

* * * * *

UNITED STATES PATENT AND TRADEMARK OFFICE
CERTIFICATE OF CORRECTION

| | | |
|---|---|---|
| PATENT NO. | : 7,009,367 B1 | Page 1 of 1 |
| APPLICATION NO. | : 10/956382 | |
| DATED | : March 7, 2006 | |
| INVENTOR(S) | : Sakurai | |

It is certified that error appears in the above-identified patent and that said Letters Patent is hereby corrected as shown below:

Title page please add:

--Foreign Application Priority Data

October 2, 2003 [JP] Japan....2003-344035--

Signed and Sealed this
Third Day of April, 2012

David J. Kappos
*Director of the United States Patent and Trademark Office*